(12) United States Patent
Kurkal-Siebert et al.

(10) Patent No.: US 10,494,907 B2
(45) Date of Patent: Dec. 3, 2019

(54) PROCESS FOR TREATING SUBTERRANEAN OIL-BEARING FORMATIONS COMPRISING CARBONATE ROCKS

(71) Applicant: BASF SE, Ludwigshafen (DE)

(72) Inventors: Vandana Kurkal-Siebert, Heidelberg (DE); Guenter Oetter, Frankenthal (DE); Nicole Lichterfeld-Weber, Römerberg (DE)

(73) Assignee: BASF SE (DE)

( * ) Notice: Subject to any disclaimer, the term of this patent is extended or adjusted under 35 U.S.C. 154(b) by 901 days.

(21) Appl. No.: 14/764,425

(22) PCT Filed: Jan. 24, 2014

(86) PCT No.: PCT/EP2014/051376
§ 371 (c)(1),
(2) Date: Jul. 29, 2015

(87) PCT Pub. No.: WO2014/118084
PCT Pub. Date: Aug. 7, 2014

(65) Prior Publication Data
US 2015/0354332 A1 Dec. 10, 2015

(30) Foreign Application Priority Data

Feb. 4, 2013 (EP) .................................. 13153893

(51) Int. Cl.
| | |
|---|---|
| *E21B 43/16* | (2006.01) |
| *C09K 8/584* | (2006.01) |
| *E21B 43/40* | (2006.01) |
| *E21B 43/26* | (2006.01) |
| *E21B 37/06* | (2006.01) |
| *C09K 8/60* | (2006.01) |
| *C09K 8/68* | (2006.01) |
| *C09K 8/74* | (2006.01) |
| *C09K 8/86* | (2006.01) |

(52) U.S. Cl.
CPC ............. *E21B 43/16* (2013.01); *C09K 8/584* (2013.01); *C09K 8/602* (2013.01); *C09K 8/68* (2013.01); *C09K 8/74* (2013.01); *C09K 8/86* (2013.01); *E21B 37/06* (2013.01); *E21B 43/26* (2013.01); *E21B 43/40* (2013.01)

(58) Field of Classification Search
CPC .......... E21B 43/16; E21B 37/06; E21B 43/26; E21B 43/40; C09K 8/58; C09K 8/584; C09K 8/602; C09K 8/68; C09K 8/74; C09K 8/86
See application file for complete search history.

(56) References Cited

U.S. PATENT DOCUMENTS

| | | | |
|---|---|---|---|
| 4,101,474 A | 7/1978 | Copeland et al. | |
| 5,042,580 A * | 8/1991 | Cullick ..................... | C09K 8/60 166/252.1 |
| 5,233,032 A * | 8/1993 | Zody ................... | C08B 37/0093 507/211 |
| 7,387,987 B2 * | 6/2008 | Chen ........................ | C09K 8/68 166/308.2 |
| 9,315,715 B2 * | 4/2016 | Faust, Jr. ............... | C09K 8/584 |
| 9,359,544 B2 * | 6/2016 | Milne ................... | E21B 43/283 |
| 2002/0023752 A1 * | 2/2002 | Qu ........................... | C09K 8/68 166/308.1 |
| 2003/0019627 A1 * | 1/2003 | Qu ........................... | C09K 8/68 166/281 |
| 2006/0185842 A1 * | 8/2006 | Chen ........................ | C09K 8/68 166/170 |
| 2007/0029085 A1 * | 2/2007 | Panga ..................... | C09K 8/035 166/263 |
| 2008/0103070 A1 | 5/2008 | Welton | |
| 2011/0092393 A1 * | 4/2011 | Faust, Jr. ................. | C09K 8/52 507/90 |
| 2011/0272325 A1 * | 11/2011 | Soane ..................... | C09K 8/524 208/14 |
| 2014/0256604 A1 * | 9/2014 | Wadekar .................. | C09K 8/74 507/237 |
| 2015/0159081 A1 * | 6/2015 | Milne ................... | E21B 43/283 166/307 |

FOREIGN PATENT DOCUMENTS

| | | |
|---|---|---|
| GB | 2352259 A | 1/2001 |
| WO | WO-2011/012164 A1 | 2/2011 |
| WO | WO-2011/086360 A1 | 7/2011 |

OTHER PUBLICATIONS

Austad, T., et al., "Chemical flooding of oil reservoirs 8. Spontaneous oil explusion from oil- and water-wet low permeable chalk material by imbibition of aqueous surfactant solutions", Colloids and Surfaces A: Physicochemical and Engineering Aspects, vol. 137, (1998), pp. 117-129.

(Continued)

*Primary Examiner* — Zakiya W Bates
*Assistant Examiner* — Crystal J Miller
(74) *Attorney, Agent, or Firm* — Drinker Biddle & Reath LLP

(57) ABSTRACT

Process for treating subterranean oil-bearing formations comprising carbonate rocks with an aqueous composition comprising cationic ammonium salts comprising four hydrocarbon radicals wherein at least one of the hydrocarbon radicals is substituted by an OH-group. The process may be a process for enhanced oil recovery, fracturing, acidizing or antiscale treatment.

26 Claims, No Drawings

(56) References Cited

OTHER PUBLICATIONS

International Search Report for PCT/EP2014/051376 dated Apr. 23, 2014.

Standnes, D.C., et al., "Wettability alteration in carbonates Interaction between cationic surfactant and carboxylates as a key factor in wettability alteration from oil-wet to water-wet conditions", Colloids and Surfaces A: Physicochemical and Engineering Aspects, vol. 216, No. 1-3, (2003), pp. 243-259.

Strand, S., et al., "Effect of Temperature on Enhanced Oil Recovery from Mixed-Wet Chalk Cores by Spontaneous Imbibition and Forced Displacement Using Seawater", Energy & Fuels, vol. 22, No. 5, (2008), pp. 3222-3225.

Strand, S., et al., "Wettability alteration of carbonates—Effects of potential determining ions ($Ca^{2+}$ and $SO_4^{2-}$) and temperature", Colloids and Surfaces A: Physicochemical and Engineering Aspects, vol. 275, (2006), pp. 1-10.

\* cited by examiner

PROCESS FOR TREATING SUBTERRANEAN OIL-BEARING FORMATIONS COMPRISING CARBONATE ROCKS

CROSS-REFERENCE TO RELATED APPLICATIONS

This application is a national stage application (under 35 U.S.C. § 371) of PCT/EP2014/051376, filed Jan. 24, 2014, which claims benefit of European Application No. 13153893.6, filed Feb. 4, 2013, both of which are incorporated herein by reference in their entirety.

The present invention relates to a process for treating subterranean oil-bearing carbonate formations comprising carbonate rocks with an aqueous composition comprising cationic ammonium salts comprising four hydrocarbon radicals wherein at least one of the hydrocarbon radicals is substituted by an OH-group. The process may be a process for enhanced oil recovery, fracturing, acidizing or antiscale treatment.

Approximately 50 percent of the crude oil reserves worldwide are captured in carbonate rock formations. Most of these carbonate reservoirs have a high degree of heterogeneity and are naturally fractured. Natural crude oil components like asphaltenes and organic acids are adsorbed at the rock surface because of its positive zeta potential. As a consequence carbonate reservoirs are often mixed wet to oil wet. A correlation between the acid number of the crude oil and the oil wetting state of the rock has been described by D. Standnes and T. Austad, J. Petroleum Science and Engineering, 28, 111-121 (2000): The higher the acid number the more oil wet is the rock surface.

Fractured oil wet carbonate fields are a great challenge for primary and enhanced oil recovery techniques mainly for two reasons: During water-flood water flows mainly through the highly permeable fractures and in addition the water is not able to imbibe into the dense oil bearing matrix blocks having a negative capillary pressure due to the oil wet nature of the rock. The result is an early water breakthrough and poor oil sweep efficiency. In contrast, in a water-wet reservoir water can imbibe into the oil bearing matrix blocks by capillary forces and reduce bypassing. Therefore the wettability of the rock plays an important role for enhanced oil recovery during water flooding in carbonate reservoirs.

It is known in the art to use chemical compounds for turning water-wet into oil-wet surfaces.

It has been suggested to use sulfates such as sodium sulfate for this purpose. The small negative charged ions are supposed to substitute natural organic carboxylates adsorbed at the rock surface thus making the surface more water wet (see e.g. Strand et al., Colloids & Surfaces, 275, 1-10 (2006) and Energy & Fuels, 22, 3222-3225 (2008)).

It has furthermore been suggested to use cationic surfactants for water flooding in carbonate formations in order to alter its wettability. It is supposed that the cationic surfactants form oil-soluble ion pairs with the adsorbed organic carboxylates thus leaving the rock surface water-wet. D. C. Standnes and T. Austad (*J. Petroleum Science and Engineering*, 28, 123-143 (2000) and also in *Colloids and Surfaces A: Physicochem. Eng. Aspects* 216 (2003) 243-259) disclose the use of n-octyltrimethylammonium bromide, n-decyltrimethylammonium bromide, n-dodecyltrimethylammonium bromide, and n-hexadecyltrimethylammonium bromide and cationic surfactants comprising phenyl groups for the wettability alteration in chalk.

The use of dodecyltrimethylammonium bromide has also been suggested by S. Strand, E. J. Høgnesen, and T. Austad, and the use of dodecyltrimethylammonium bromide, tetradecyltrimethylammonium bromide, and hexadecyltrimethylammonium bromide by T. Austad et al. (*Colloids and Surfaces A: Physicochem. Eng. Aspects* 117 (1998) 117-129).

WO 2011/086360 A1 discloses treatment fluids for wetting control of multiple rock types which comprise a first surfactant having a charge, a second surfactant having an opposite charge and a compatilizer. The surfactants may be cationic surfactants such as alkyl ammonium chlorides and anionic surfactants such as alkyl ether sulfates and the compatilizer may be selected from various surfactants, including ethoxylated sorbitan fatty acid esters.

Besides the property of changing the rock wettability other properties like lowering the oil/water interfacial tension are important to mobilize crude oil captured in small capillary necks.

There is still a need to improve oil production from carbonate reservoirs. It is therefore an object of the invention to provide an improved process for treating subterranean hydrocarbon containing carbonate formations with cationic surfactants.

Correspondingly, a process for treating subterranean oil-bearing formations comprising carbonate rocks has been found which comprises at least the following steps
  injecting an aqueous composition comprising at least one cationic surfactant (S) into at least a portion of the oil-bearing formation,
  allowing the composition to interact with oil-wet surfaces in the formation,
  wherein the cationic surfactant (S) has general formula (I)

$$[R^1\text{---}N(R^2)(R^3)(R^4)]^+ 1/m X^{m-} \quad (I),$$

and $R^1$, $R^2$, $R^3$, $R^4$ and $X^{m-}$ have the following meaning:
  $R^1$; a group selected from the group of $R^{1a}$ and $R^{1b}$ wherein
    $R^{1a}$ is an aliphatic linear or branched hydrocarbon radical having from 10 to 22 carbon atoms, and
    $R^{1b}$ is an aliphatic linear or branched hydrocarbon radical having from 10 to 22 carbon atoms substituted by 1 to 3 OH-groups, and
  $R^2$, $R^3$, and $R^4$ may be the same or different and are selected from the group of
    $R^{2a}$, $R^{3a}$, $R^{4a}$: alkyl groups having from 1 to 4 carbon atoms,
    $R^{2b}$, $R^{3b}$, $R^{4b}$: OH-substituted alkyl groups having from 1 to 4 carbon atoms, and
    $R^{2c}$, $R^{3c}$, $R^{4c}$: alkylether groups of the formula

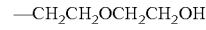

—CH$_2$CH$_2$OCH$_2$CH$_2$OH and

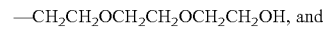

—CH$_2$CH$_2$OCH$_2$CH$_2$OCH$_2$CH$_2$OH, and $X^{m-}$ is an anion, wherein m is 1, 2, or 3,
  with the proviso, that at least one of the groups $R^1$, $R^2$, $R^3$, and $R^4$ comprises an OH-group and the total number of OH groups in the surfactant (S) is from 1 to 4.

Surprisingly it has been found that such hydroxy substituted surfactants have a significantly better performance in processes of treating subterranean hydrocarbons containing formations than the unsubstituted long-chain alkyl trialkylammonium salts known in the art.

With regard to the invention, the following should be stated specifically:

Cationic Surfactants

In the process according to the invention an aqueous composition comprising at least one cationic surfactant (S) is used for treating subterranean hydrocarbon containing formations. The cationic surfactant is an ammonium salt comprising four hydrocarbon radicals with the proviso, that at least one of hydrocarbon radicals is substituted by at least one OH-group.

The surfactants (S) are of the following general formula (I)

$R^1$ is a group selected from the group of $R^{1a}$ and $R^{1b}$, wherein $R^{1a}$ is a hydrocarbon radical and $R^{1b}$ is an OH-substituted hydrocarbon radical.

The group $R^{1a}$ is an aliphatic linear or branched hydrocarbon radical having from 10 to 22 carbon atoms. Preferably $R^{1a}$ has from 12 to 20 carbon atoms, more preferably 14 to 18 carbon atoms and for example 12 to 18 carbon atoms. Branched hydrocarbon radicals $R^{1a}$ may have any degree of branching chemically possible. In one embodiment of the invention $R^{1a}$ has not more than 2 branches, preferably not more than one branch. Preferably, $R^{1a}$ is an alkyl radical, more preferably a linear alkyl radical. Examples of suitable groups $R^{1a}$ comprise n-decyl-, n-undecyl-, n-dodecyl-, n-tetradecyl-, n-hexadecyl-, n-octadecyl-, n-eicosyl-, or n-docosanyl groups.

The group $R^{1b}$ is an OH-substituted aliphatic linear or branched hydrocarbon radical having from 10 to 22 carbon atoms. Preferably $R^{1b}$ has from 12 to 20 carbon atoms, more preferably 14 to 18 carbon atoms and for example 12 to 18 carbon atoms. Branched hydrocarbon radicals $R^{1b}$ may have any degree of branching chemically possible but should preferably have not more than 2 branches, more preferably not more than one branch. Preferably, $R^{1b}$ is an OH-substituted alkyl radical, more preferably an OH-substituted linear alkyl radical. The number of OH-groups in $R^{1b}$ is from 1 to 3, preferably 1 or 2 and most preferably $R^{1b}$ is a radical having one OH-group.

In a preferred embodiment of the invention, $R^{1b}$ has the general formula $R^5$—CH(OH)—CH$_2$— (II), wherein $R^5$ is a linear or branched alkyl group having from 8 to 20 carbon atoms, preferably 10 to 18 carbon atoms, more preferably 12 to 14 carbon atoms and for example 10 to 16 carbon atoms. Preferably, $R^5$ is a linear alkyl group having from 8 to 20 carbon atoms, preferably 10 to 18 carbon atoms, more preferably 12 to 14 carbon atoms and for example 10 to 16 carbon atoms. Examples of groups $R^{1b}$ comprise 2-hydroxydecyl-, 2-hydroxydodecyl-, 2-hydroxytetradecyl-, 2-hydroxyoctadecyl-, or 2-hydroxyeicosyl- groups.

The groups $R^2$, $R^3$, and $R^4$ may be the same or different and are selected respectively from the group of $R^{2a}$, $R^{1a}$, $R^{4a}$: Alkyl groups having from 1 to 4 carbon atoms, preferably methyl or ethyl, and most preferably a methyl group, $R^{2b}$, $R^{3b}$, $R^{4b}$: OH-substituted alkyl groups having from 1 to 4 carbon atoms, preferably 1 or 2 carbon atoms, and most preferably a 2-hydroxyethyl- group (—CH$_2$CH$_2$OH)

$R^{2c}$, $R^{3c}$, alkylether groups of the formula

—CH$_2$CH$_2$OCH$_2$CH$_2$OH and

—CH$_2$CH$_2$OCH$_2$CH$_2$OCH$_2$CH$_2$OH

In order to avoid misunderstandings, $R^2$ is selected from $R^{2a}$, $R^{2b}$, and $R^{2c}$, $R^3$ is selected from $R^{3a}$, $R^{3b}$, and $R^{3c}$, and $R^4$ is selected from $R^{4a}$, $R^{4b}$, and $R^{4c}$.

According to the invention the radicals $R^1$, $R^2$, $R^3$, and $R^4$ are chosen in such a manner, that at least one of the radicals $R^1$, $R^2$, $R^3$, and $R^4$ comprises an OH-group, with the proviso that the total number of OH groups in the surfactant of formula (I) is from 1 to 4, preferably 1 to 3, and more preferably 2.

$X^{m-}$ is an anion, wherein m is 1, 2, or 3, preferably 1 or 2 and most preferably 1. Examples of anions include F$^-$, Cl$^-$, Br$^-$, I$^-$, CH$_3$SO$_3^-$, CF$_3$SO$_3^-$, SO$_4^{2-}$, NO$_3^-$ or PO$_4^{3-}$. Preferred anions include Cl$^-$ and Br$^-$.

Besides regarding the abovementioned requirements, the skilled artisan may select the radicals $R^1$, $R^2$, $R^3$, and $R^4$ according to his/her needs.

In one embodiment of the invention, the surfactant (S) according to the invention comprises a group $R^{1b}$. Preferably, the group $R^{1b}$ is substituted by one OH, more preferably, $R^{1b}$ is a group of the general formula $R^5$—CH(OH)—CH$_2$— (II).

In another embodiment of the invention, the surfactant (S) according to the invention comprises a group $R^{2b}$, which preferably is a 2-hydroxyethyl group. $R^3$ and $R^4$ may be groups $R^{3a}$ and $R^{4a}$ respectively, preferably ethyl or methyl groups.

In a further embodiment of the invention, the surfactant (S) according to the invention comprises a group $R^{1b}$, preferably a group of the general formula $R^5$—CH(OH)—CH$_2$— (II), a group $R^{2b}$, preferably a 2-hydroxyethyl group, a group $R^{3a}$, preferably a methyl group and a group $R^{4a}$, preferably a methyl group. In this embodiment, $R^5$ preferably has from 10 to 16 carbon atoms, more preferably from 12 to 16 carbon atoms.

In one preferred embodiment of the invention the surfactant (S) according to the invention is a (2-hydroxyethyl)(2-hydroxyhexadecyl)dimethylammonium salt, preferably a chloride or a bromide salt.

The manufacture of cationic surfactants (S) is known to the skilled artisan, and surfactants are commercially available.

Aqueous Formulations

For the process according to the present invention an aqueous composition comprising at least one cationic surfactant (S) of the general formula [R$^1$—N(R$^2$)(R$^3$)(R$^4$)]$^+$1/m X$^{m-}$ (I) as described in detail above is used. Of course, two or more different surfactants (S) of formula (I) may be used. The skilled artisan may select specific surfactants according to his/her needs.

Further components of the aqueous composition are chosen by the skilled artisan according to the needs of the process.

Besides water the aqueous composition may also comprise organic solvents miscible with water. Examples of such solvents comprise alcohols such as ethanol, n-propanol, 1-propanol, or butyl monoglycol. If organic solvents are present their amount should not exceed 50% by weight with respect to all solvents present in the composition, preferably it should not exceed 25% by weight, more preferably not more than 10% by weight. In a preferred embodiment of the invention only water is used as solvent.

The water used may be saline water comprising dissolved salts. Examples of salts comprise halogenides, in particular chlorides, sulfates, borates of mono- or divalent cations such as Li$^+$, Na$^+$, K$^+$, Mg$^{2+}$, Ca$^{2+}$, Sr$^{2+}$, or Ba$^{2+}$. The salinity of the water may be from 1,000 ppm to 230,000 ppm.

The concentration of the surfactants (S) according to formula (I) may be from 0.01% to 10% by weight with respect to the total of all constituents of the aqueous composition, preferably from 0.1% to 5% by weight and more preferably from 0.1% to 2% by weight.

The aqueous composition may comprise further constituents such as anionic, cationic, nonionic and amphoteric surfactants as well as polymers, inorganic salts like sodium chloride or potassium chloride, alkali like sodium hydroxide or sodium hydrogen carbonate or alternatively acids such as HCl or methane sulfonic acid. Of course, also surfactants (S) different from those of formula (I) may be used. The amount of each of such further constituents may be from 0.01% to 10% by weight.

In one embodiment of the invention the aqueous solution comprises carboxylic acids or preferably salts of carboxylic acids. Carboxylic acids may be aliphatic and/or aromatic carboxylic acids. In a preferred embodiment, salicylic acid and/or salts thereof, for instance sodium salicylate may be used. In one embodiment, the aqueous solution comprises (2-hydroxyethyl)(2-hydroxyhexadecyl)dimethylammonium salt, preferably a chloride and/or a bromide salt and salicylic acid and/or salts thereof, for example sodium salicylate. The amount of salicylic acid and/or salts thereof may be from 1 to 100 mol % with respect to the surfactant (S), in particular (2-hydroxyethyl)(2-hydroxyhexadecyl)dimethylammonium salt, preferably the chloride and/or a bromide salt.

The aqueous composition may be made by mixing water, the surfactant(s) (S) and optionally further components. The water used may be fresh water but also sea water or formation water may be used, i.e. more or less saline water. It is one of the advantages of the surfactants (S) used for the process according to the invention that they show good results in saline water.

The surfactant (S) may be provided as concentrated aqueous solution which is used to mix the aqueous composition to be used directly at the location of use, e.g. on the oilfield.

Process for Treating Subterranean Carbonate Formations

The process for treating subterranean oil-bearing formations may be applied to any kind of subterranean formation comprising carbonate rocks, such as calcite and/or dolomite rocks. In a preferred embodiment of the invention, the formation essentially consists of carbonate rocks.

Oil in the formation may be any kind of crude oil, for instance light oils or heavy oils. The crude oil may comprise acidic compounds. The acid number of the crude oil may be from 0.1 mg KOH/g to 6 mg KOH/g.

Besides crude oil the subterranean formation may comprise formation water. Formation water usually is brine and its salinity may be from 1,000 ppm to 230,000 ppm. The temperature of the formation may be from 20° C. to 150° C., preferably from 40° C. to 120° C., and by the way of example from 80° C. to 130° C.

The subterranean formation in the usual manner comprises surfaces, in particular the inner surfaces of pores, cavities, and capillaries of the subterranean, oil-bearing formation. Inner surfaces also include the surfaces of scales deposited in the formation. Scales may be carbonate scales, such as calcium or magnesium carbonate scales, sulfate scales such as calcium sulfate scales.

Such surfaces in carbonate formations usually are oil-wet. It goes without saying for the skilled artisan that a surface which is oil-wet will be more or less hydrophobic. The degree of hydrophobicity may be determined in the usual manner by measuring the contact angle of the oil on the surface. Usually, the contact angle should be from 0° to 30°, preferably from 0° to 10° and most preferably about 0°. The oil may cover the surface in the carbonate formation completely, for instance it may form a continuous film or only a part of the surface may be covered with oil.

In the process according to the present invention, an aqueous composition comprising at least one cationic surfactant (S) as described above is injected into at least a portion of the oil-bearing formation. Injection may be carried out by injecting the aqueous composition into injections wells and/or into production wells drilled into the formation. Injection may be performed through only one well or through more than one wellbore.

In course of injection, the aqueous composition flows through channels, pores, cavities and the like from the wellbore into the formation. It goes without saying for the skilled artisan that the pressure of injection needs to be high enough to allow the aqueous composition to penetrate into the formation. The depth of penetration may be selected by the skilled artisan in the usual manner, for example by selecting appropriate injection pressures and/or injection times. In course of injection into the formation the aqueous composition comes into contact with oil-wet surfaces in the formation and the aqueous composition is allowed to interact with oil-wet surfaces in the oil bearing formation. In course of such interaction the oil-wet surface becomes more hydrophilic. The contact angle between the surface and the oil becomes larger and larger and finally drops of oil may become detached from the surface.

The process described above may be a part of oilfield processes and may be combined with further process steps. Oilfield processes include fracturing, acidizing, enhanced oil recovery preparing the reservoir for anti-scale treatments, completion processes after drilling where rock surfaces are smeared with oil and oil needs to be removed.

In one embodiment of the invention the process is a process for enhanced oil recovery. As described above, the carbonate formation besides oil usually comprises formation water and it furthermore comprises oil-wet surfaces. The temperature of the formation and the salinity of the formation water may be as described above. The oil-bearing formation comprises at least one injection well and at least one production well. The aqueous composition is injected into the subterranean carbonate formation through at least one injection well under a pressure sufficient so that the injected composition flows through the subterranean formation towards at least one production well. Thereby it comes into contact with oil-wet surfaces of the formation and under the influence of at least one cationic surfactant (S) the surface becomes more and more water-wet. As a consequence spontaneous imbibition of the water into the capillaries of the carbonate rock due to capillary forces takes place and oil is pressed out of the capillaries. The mixture comprising oil and water from the formation flows to the production well.

In a following step the produced mixture of crude oil and formation water may be separated in the usual manner into a phase of crude oil and a phase of formation water. Said separation may be done using usual equipment and optionally usual demulsifiers as process aids.

In one embodiment of the process for enhanced oil recovery separated saline formation water may be used for making the aqueous composition comprising the cationic surfactant (S). Only formation water may be used or formation water mixed with fresh water or sea water may be used. The aqueous composition comprising salts may thereafter be injected through the injection well into the formation thereby recycling at least a part of the formation water.

This is an economic advantage in particular for oil production on land where it is difficult to dispose formation water.

In a second embodiment of the invention the process is a hydraulic fracturing process. The aqueous composition is injected into the subterranean oil-bearing formation through a production well. The temperature of the formation and the salinity of the formation water may be as described above. In course of the treatment of the formation oil-wet surfaces become water-wetted. In a second step, an aqueous fracturing fluid comprising thickening components is injected through the production well. The injection is done at a pressure sufficient to fracture the rocks of the formation. Said fractures are usually formed in a zone around the production well. Through the fractures formed oil may flow from the formation to the production well thus allowing an increased oil production.

Processes of fracturing and suitable aqueous fracturing fluids therefore are known to the skilled artisan. Suitable examples of aqueous fracturing fluids are disclosed in WO 2011/012164 A1. Besides thickening components, fracturing fluids may comprise so called proppants. Proppants are small hard particles which cause that formed fractures do not close after removing the pressure. The step of water wetting oil-wet surfaces before injecting the fracturing fluid improves the penetration of the aqueous fracturing fluid into the formation thereby improving the process of forming fractures.

In an alternative embodiment of the fracturing process, the cationic surfactant (S) may be a component of the aqueous fracturing fluid used. In this embodiment, a separate injection of an aqueous composition comprising the cationic surfactant (S) as described above may be omitted.

In a third embodiment of the process according to the invention the process is an acidizing process. The aqueous composition is injected into the subterranean oil-bearing formation through a production well. The temperature of the formation and the salinity of the formation water may be as described above. In course of the treatment of the formation oil-wet surfaces become water-wetted. In a second step, an aqueous acid composition is injected through the production well.

The acid dissolves scale and may form new cavities, pores and the like in the formation thereby creating new channels for the oil to flow from the formation to the production well thus increasing oil production.

In an alternative embodiment of the acidizing process, the cationic surfactant (S) may be a component of the aqueous acid used. In this embodiment, a separate injection of an aqueous composition comprising the cationic surfactant (S) as described above may be omitted.

In a fourth embodiment of the process according to the invention the process is a process for the removal of scale in course of oil-production. The oil-wet surfaces are the surfaces of scale deposited in an oil-bearing formation and/or a wellbore and/or oil production equipment. In a first step the oil-wet surfaces of the scale are treated with the aqueous composition comprising a wettability modifier and the oil-wet surfaces become water wet. In a second step the scale is treated with an aqueous composition comprising at least one scale inhibitor thereby removing or at least reducing scale. Water-wetting the surfaces before treating with the scale inhibitor significantly improves the efficiency of the scale removal.

It has been found that aqueous solutions of the surfactants (S), in particular solutions of the surfactants in saline water may show viscoelastic behavior under certain conditions thus giving rise to further applications because viscoelastic solutions have a higher viscosity. Such viscoelastic effects may be enhanced by carboxylic acids or preferably salts of carboxylic acids.

In one embodiment of the invention an aqueous formulation comprising at least the surfactant (2-hydroxyethyl)(2-hydroxyhexadecyl)dimethylammonium salt, preferably a chloride and/or a bromide salt which shows viscoelastic properties may be used for the process of the invention. Preferably, an aqueous formulation having a salinity of 1,000 ppm to 200,000 ppm, more preferably from 10,000 ppm to 150,000 and most preferably from 20,000 ppm to 100,000 ppm may be used. Advantageously, the aqueous formulation may comprise additionally salicylic acid and/or salts thereof, for example sodium salicylate. The amount of salicylic acid and/or salts thereof may be from 1 to 100 mol % with respect to the surfactant. Such formulations may in particular be used for formations having a formation temperature of 10° C. to 50° C., preferably 20 to 40° C.

In a preferred embodiment of the invention the process according to the invention is a fracturing process and a viscoelastic formulation, in particular an aqueous formulations comprising (2-hydroxyethyl)(2-hydroxyhexadecyl)dimethylammonium salt, preferably a chloride and/or a bromide salt and optionally salicylic acid and/or salts thereof is used as fracturing fluid and injected into the formation at a pressure sufficient to fracture the rocks of the formation. In such a formulation the surfactant serves as viscosity generating agent. Of course also another viscifiifying agent may be present.

In a second preferred embodiment of the invention the process according to the invention is a process of conformance control and a viscoelastic formulation as described above is injected into at least one injection wellbore of a formation comprising at least one injection well and at least one production well thus fully or at least partially plugging formation zones having a higher permeability than other zones of the formation.

The invention is illustrated in detail by the examples which follow.

Used Surfactants:

For the tests the following OH-substituted cationic surfactant was used:
Surfactant S1 (2-hydroxyethyl)(2-hydroxyhexadecyl)dimethylammonium chloride For comparative purposes, the following surfactants were used
Surfactant C1 n-dodecyltrimethylammonium bromide
Surfactant C2 $C_{10/12}$— alkyl polyglucoside
Surfactant C3 $R^1$—O—(—$CH_2$—$CH_2$—O—)$_{15}$—H; $R^1$=i-tridecyl C1 is a cationic surfactant of the alkyl trialkylammonium type, which has often been suggested in the state in the art, however which does not comprise OH-groups. The surfactants C2 and C3 are non-ionic surfactants.

Application Tests:

Amott Imbibition Test:

The Amott test is the most commonly used method to describe wettability of oil/brine/rock systems (Amott, E., "Observations relating to the wettability of porous rock", Trans., A/ME, 216, 155-162, (1959)).

In the Amott test, chalk cylinders (2.5 cm in diameter, 5 cm in height) were flooded and saturated with crude oil. The cores were aged for one week at 63° C. surrounded by crude oil in a closed container. The aged cores were placed into Amott cells, filled with 250 ml aqueous solution of 5 WI surfactant dissolved in brine (about 80,000 ppm salt, pH 7.4). The volume of oil produced by imbibition of surfactant solution at 63° C. was measured as function of time.

For the tests, crude oil of a Canadian oil field was used. The natural acid number of the crude oil was 0.3 mg KOH/g oil. It was extended by stearic acid to 1.6 mg KOH/g oil to make the carbonate rock surfaces more oil wet.

For the tests surfactant S1 was used as surfactant. For comparative purposes a test was performed without any surfactant and furthermore the comparative surfactants C1, C2, and C3 were tested. The results are summarized in table 1.

TABLE 1

Results of the Amott imbibition test at 63° C., Oil production [%] as a function of time [h], test series 1

| No. | Surfactant | 0.16 | 0.33 | 0.5 | 0.66 | 0.83 | 1 | 1.5 | 2 | 3 | 4 | 24 | 48 | 120 | 144 | 168 | 192 |
|---|---|---|---|---|---|---|---|---|---|---|---|---|---|---|---|---|---|
| Com. Exp. 1 | — | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Exp. 1 | S1 | 0.1 | 0.1 | 0.1 | 0.1 | 0.1 | 0.4 | 0.4 | 1.7 | 1.7 | 3.4 | 9.3 | 11.9 | 19.5 | 20.4 | 22.1 | 22.9 |
| Com. Exp. 2 | C1 | 0.1 | 0.1 | 0.1 | 0.1 | 0.1 | 0.4 | 0.4 | 0.4 | 0.4 | 0.4 | 0.4 | 0.4 | 0.8 | 0.8 | 0.8 | 0.8 |
| Com. Exp. 3 | C2 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Com. Exp. 4 | C3 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

The examples and comparative examples demonstrate that the oil production from carbonate cores saturated with oil strongly increases when using the OH-substituted cationic alkyl ammonium salts (Surfactant S1) as surfactants. Under the test conditions after 8 days 22.9% of the oil was recovered. With the unsubstituted surfactant n-dodecyltrimethylammonium bromide (Surfactant) only 0.8% of the oil was recovered, whereas the two nonionic surfactants S2 and S3 had no effect.

Interfacial Tension (IFT)

The measurements of the interfacial tension were performed with a spinning drop tensiometer (DataPhysics). Decane and crude oil from a Canadian oil field were used as oils. Tests were performed at 63° C. in formation water of said Canadian oil field having a salinity of about 80,000 ppm. The concentration of the surfactants was 5 g/l.

The surfactants S1 and C1 and a combination of S1 and butylmonoglycol (9:1 wt/wt) were tested. Results are summarized in Table 3.

TABLE 3

The results of the IFT measurements clearly demonstrate that Surfactant S1 yields a far lower IFT as compared to the comparative Surfactant C1. Therefore, S1 should have a better performance in mobilizing oil droplets captured in small capillary necks. Mixing S1 with small amounts of butylmonoglycol yields in a significant reduction of the IFT compared to using only surfactant S1.

| | | | IFT after 1 minute [mN/m] | |
|---|---|---|---|---|
| | Surfactant | Concentration | Weyburn crude oil | Decane |
| Comp. Exp. 5 | C1 | 5 g/l | 1.8 | 4.9 |
| Exp. 5 | S1 | 5 g/l | 0.09 | 1.9 |
| Exp. 6 | mixture of S1 + Butylmonoglycol (9:1) | 5 g/l | 0.04 | 1.4 |

Viscoelasticity

Rheological measurements were performed with an Anton Paar MCR 301 rheometer using aqueous solutions comprising surfactant S1. At constant frequency of 10 rad/s the deformation was varied and both, the storage modulus and the loss modulus were measured. The data in table 4 were taken at a deformation of 10%.

For the tests aqueous solutions of surfactant S1 and optionally sodium salicylate were used. The solvent for S1 was water comprising NaCl and $CaCl_2$ (9:1 by wt.). The concentration of the surfactant S1 was 5 g/l. The total salinity of the water used, the amount of sodium salicylate, the storage modulus measured at 25° C. and at 30° C., and the loss modulus measured at 25° C. and at 30° C. are represented in table 4.

TABLE 4

Results of rheological measurements (frequency: 10 rad/s; deformation: 10%)

| Salinity NaCl/$CaCl_2$ (9:1) [wt. %] | Amount of sodium salicylate [mol % with respect to S1] | Storage modulus [mPa] 25° C. | Storage modulus [mPa] 30° C. | Loss modulus [mPa] 25° C. | Loss modulus [mPa] 30° C. |
|---|---|---|---|---|---|
| 15 | 5 | 120 | 62 | 343 | — |
| 15 | 10 | 382 | 164 | 493 | — |
| 6 | 0 | 80 | 58 | 168 | 137 |
| 6 | 10 | 256 | 208 | 374 | 390 |
| 6 | 20 | 572 | 533 | 373 | 420 |
| 6 | 30 | 1120 | 1070 | 421 | 611 |
| 6 | 40 | 1015 | 715 | 603 | 669 |

The results show that the solutions of S1 in saline water are viscoelastic. The viscoelastic effect is boosted when sodium-salicylate is added.

The invention claimed is:

1. A process for treating a subterranean oil-bearing formation comprising carbonate rocks wherein the process comprises at least the following steps:
   injecting an aqueous composition comprising at least one cationic surfactant (S) and water into at least a portion of the subterranean oil-bearing formation,
   allowing the aqueous composition to interact with oil-wet surfaces in the subterranean oil-bearing formation,
   wherein the cationic surfactant (S) is a (2-hydroxyethyl) (2-hydroxvhexadecyl) dimethylammonium salt,
   wherein the process is a process for enhanced oil recovery, wherein the aqueous composition is injected into the subterranean oil-bearing formation containing hydrocarbons through at least one injection well, the injected water flows through the subterranean oil-bearing formation towards a production well, thereby detaching oil from oil-wet surfaces of the subterranean oil-bearing formation, and producing a mixture comprising oil and water from the subterranean oil-bearing formation through the production well.

2. The process according to claim 1, wherein the concentration of the surfactant (S) in the aqueous composition is from 0.01% by weight to 10% by weight.

3. The process according to claim 1, wherein the temperature of the subterranean oil-bearing formation is from 20° C. to 150° C.

4. The process according to claim 1, wherein the temperature of the subterranean oil-bearing formation is from 40° C. to 120° C.

5. The process according to claim 1, wherein the subterranean oil-bearing formation also comprises formation water.

6. The process according to claim 5, wherein the water has a salinity of from 1,000 ppm to 230,000 ppm.

7. The process according to claim 1, wherein the oil-water mixture produced from the formation is separated into an oil phase and a water phase, the separated water is used for making the aqueous composition comprising the cationic surfactant (S) and the aqueous composition is injected through the injection well into the formation.

8. The process according claim 1, wherein the oil-wet surfaces are surfaces of scale deposited in the subterranean oil-bearing formation, wherein the step of treating the subterranean oil-bearing formation with the aqueous fluid is followed by the treatment with an aqueous composition comprising at least one scale inhibitor.

9. The process according claim 1, wherein the oil-wet surfaces are surfaces of scale deposited in the subterranean oil-bearing formation, and wherein the aqueous composition further comprises at least one scale inhibitor.

10. The process according to claim 1, wherein the salt is a chloride or a bromide salt.

11. A process for treating a subterranean oil-bearing formation comprising carbonate rocks wherein the process comprises at least the following steps:
   injecting an aqueous composition comprising at least one cationic surfactant (S) into at least a portion of the subterranean oil-bearing formation,
   allowing the aqueous composition to interact with oil-wet surfaces in the subterranean oil-bearing formation,
   wherein the surfactant (S) is a (2-hydroxyethyl) (2-hydroxyhexadecyl) dimethylammonium salt.

12. The process according to claim 11, wherein the salt is a chloride or a bromide salt.

13. The process according to claim 11, wherein the process is a hydraulic fracturing process, wherein the aqueous composition is injected into the subterranean oil-bearing formation through a production well, followed by the injection of an aqueous fracturing fluid comprising at least thickening components at a pressure sufficient to fracture the rocks of the formation.

14. The process according to claim 11, wherein the process is a hydraulic fracturing process, wherein the aqueous composition is an aqueous fracturing fluid further comprising at least thickening components, and the aqueous fracturing fluid is injected into the subterranean oil-bearing formation through a production well at a pressure sufficient to fracture the rocks of the subterranean oil-bearing formation.

15. The process according to claim 11, wherein the process is an acidizing process, wherein the aqueous composition is injected into the subterranean oil-bearing formation through a production well, followed by the injection of an aqueous acid composition.

16. The process according to claim 11, wherein the process is an acidizing process, wherein the aqueous composition is an aqueous acid composition further comprising at least an acid, and the aqueous acid composition is injected into the subterranean oil-bearing formation through a production well.

17. The process according to claim 11, wherein the process is a fracturing process wherein the aqueous composition has a salinity of 1,000 ppm to 200,000 ppm comprising the (2-hydroxyethyl)(2-hydroxyhexadecyl)dimethylammonium salt, the formation temperature is from 10° C. to 50° C., and wherein the aqueous composition is injected into the subterranean oil-bearing formation through a production well at a pressure sufficient to fracture the rocks of the subterranean oil-bearing formation.

18. The process according to claim 17, wherein the aqueous composition further comprises salicylic acid and/or salts thereof.

19. The process according to claim 18, wherein the amount of the salicylic acid and/or salts thereof is from 1 to 100 mol % with respect to the surfactant(s) (S).

20. The process according to claim 11, wherein the process is a process for conformance control wherein the subterranean oil-bearing formation temperature is from 10° C. to 50° C. and the aqueous composition has a salinity of 1,000 ppm to 200,000 ppm comprising a (2-hydroxyethyl) (2-hydroxyhexadecyl)dimethylammonium salt, wherein the aqueous composition is injected into at least one injection well, and the injected aqueous composition flows through the subterranean oil-bearing formation towards a production well, thereby plugging or at least partially plugging zones having a higher permeability than other zones of the subterranean oil-bearing formation.

21. The process according to claim 11, wherein the concentration of the surfactant (S) in the aqueous composition is from 0.01% by weight to 10% by weight.

22. The process according to claim 11, wherein the temperature of the subterranean oil-bearing formation is from 20° C. to 150° C.

23. The process according to claim 22, wherein the formation water has a salinity of from 1,000 ppm to 230,000 ppm.

24. The process according to claim 11, wherein the temperature of the subterranean oil-bearing formation is from 40° C. to 120° C.

25. The process according to claim 11, wherein the subterranean oil-bearing formation also comprises formation water.

26. The process according to claim 11, wherein the oil-water mixture produced from the subterranean oil-bearing formation is separated into an oil phase and a water phase, the separated water is used for making the aqueous composition comprising the cationic surfactant (S) and the aqueous composition is injected through the injection well into the subterranean oil-bearing formation.

* * * * *